No. 807,230. PATENTED DEC. 12, 1905.
J. C. ZUBLI.
APPARATUS FOR SUBMARINE EXPLORATIONS.
APPLICATION FILED MAY 16, 1905.

2 SHEETS—SHEET 1.

Witnesses:
E. O. Niedebrand
M. F. Anderson

Inventor
Justus Cornelis Zubli
by Georgii & Massie
Attorneys

UNITED STATES PATENT OFFICE.

JUSTUS CORNELIS ZUBLI, OF AMERSFOORT, NETHERLANDS.

APPARATUS FOR SUBMARINE EXPLORATIONS.

No. 807,230. Specification of Letters Patent. Patented Dec. 12, 1905.

Application filed May 16, 1905. Serial No. 260,673.

*To all whom it may concern:*

Be it known that I, JUSTUS CORNELIS ZUBLI, of Amersfoort, Netherlands, have invented a new and useful Improvement in Apparatus for Submarine Explorations, which improvement is fully set forth in the following specification.

This invention relates to apparatus by means of which bodies under water may be observed from above the surface, either when at rest or moving at a great depth and at a considerable distance. The apparatus enables an observer to readily follow salvage operations performed by any suitable appliances and to direct their use.

The construction of the apparatus is based on the well-known fact that if a mirror upon which a beam of light falls be turned through an angle the reflected beam is turned through twice that angle. This apparatus utilizes this fact for the simultaneous illumination and observation from a fixed point of any part of the surface it is desired to observe or on which it is desired to work. For this purpose the apparatus is composed of a water-tight tube, which is rigid or formed of rigid parts, and has at its end a glazed aperture. Behind this aperture are arranged a projector and a mirror, whose movements of rotation round two parallel axes are in the ratio of two to one, or if a projector and a mirror are turned round two parallel axes in order that the point illuminated may be reflected by the mirror in a fixed direction it is necessary that the displacement of the projector be double that of the mirror. An observer on the surface by turning this apparatus when supported vertically in the water and sunk to the desired depth and by turning the projector and mirror can, by looking down the axis of the tube, see everything, so far as the state of the water allows.

The accompanying drawings show, as an example, some forms in which the invention may be carried out in practice.

Figure 1:
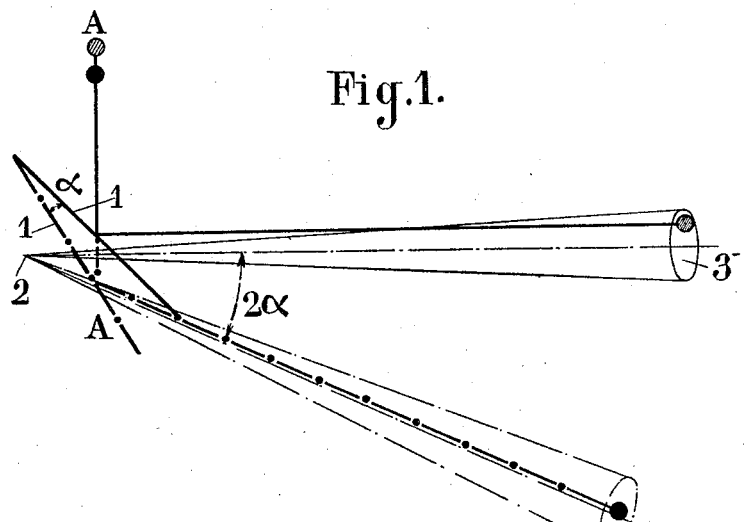
Figures 2, 3:
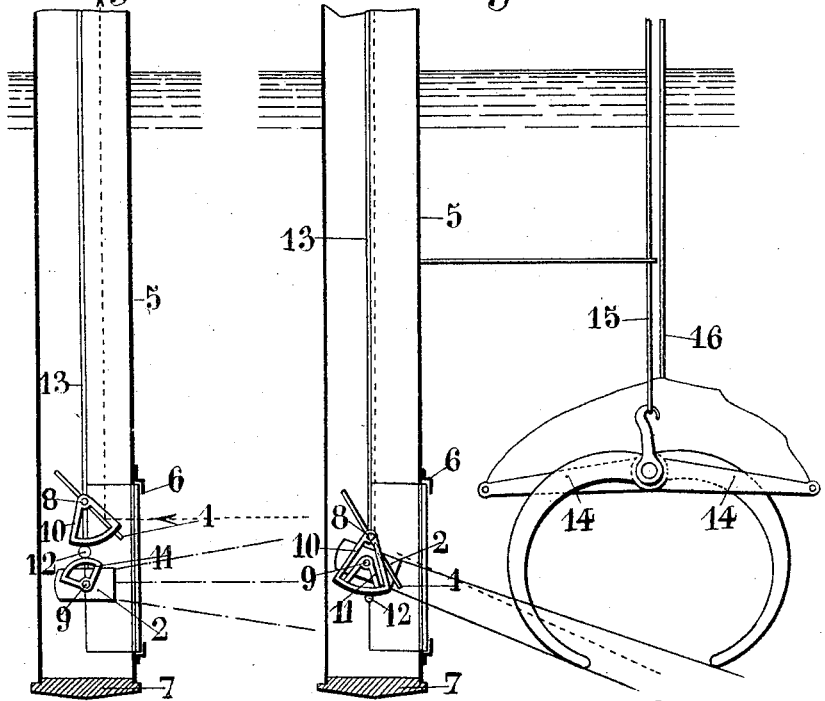
Figure 4:
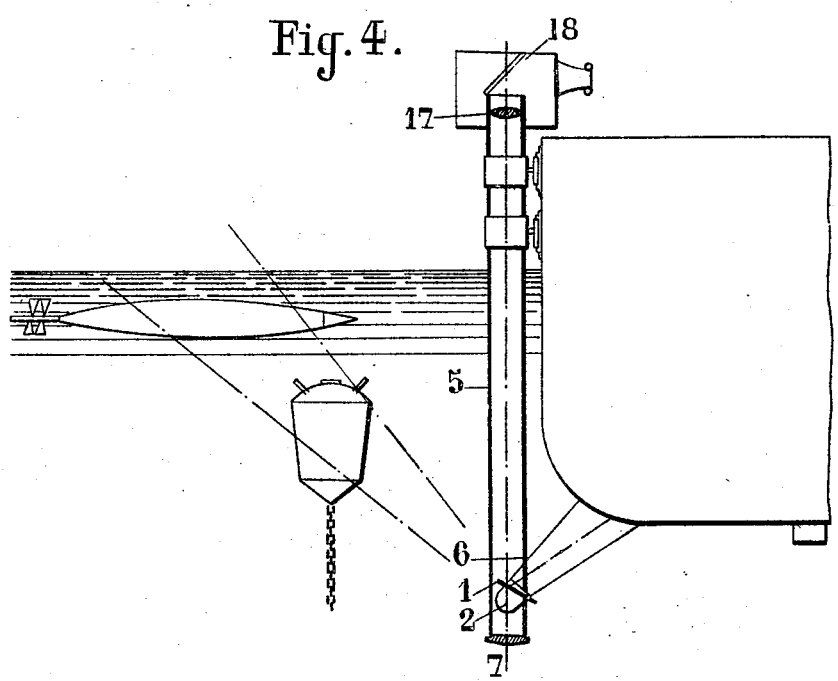
Figure 5:
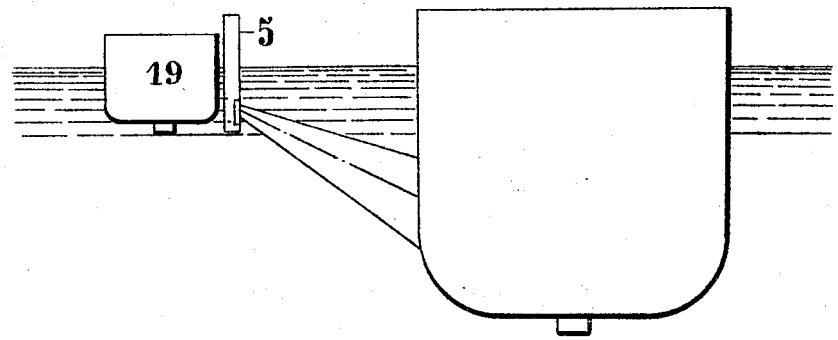

Figure 1 is a diagram illustrating the working of the apparatus. Figs. 2 and 3 are longitudinal sections of two forms of apparatus with different means of moving the mirror, one of these apparatuses being intended for use in the direction of operations for the recovery of sunken bodies. Figs. 4 and 5 illustrate the application of the invention to the inspection of the hull of a ship.

Fig. 1 shows the principle on which the apparatus works independently of any question of the form of construction. Bearing in mind the fact above stated it is obvious that if a mirror 1 and a projector 2 are arranged in the position shown in full lines, so that the luminous field 3 may be seen by reflection in the mirror along the line A A, it is necessary, if the projector be turned through an angle $2\alpha$, that the mirror be turned only through an angle $\alpha$, as shown in dotted lines, in order that the new luminous field 4 may still be visible in the mirror along the line A A. If, then, it is desired to have only a single means of controlling the projector and the mirror, it is only necessary to so arrange this that the angular movement of the projector is twice that of the mirror.

The apparatus shown in Fig. 2 consists of a plain or telescopic metal tube with water-tight joints, having at its lower end an aperture closed by a suitable glass 6 thick enough to resist the pressure of the water. Inside the tube and opposite the glass are a mirror 1 and a projector 2, turning, respectively, on parallel horizontal axes 8 and 9 and fast with toothed sectors 10 and 11, whose radii are in the proportion of two to one and which both engage with a pinion 12, which can be rotated from above the surface of the water by a rod 13 and bevel-gear, a worm, or other means. If desired, the mirror, projector, and their operating-gear may receive a rotary movement as a whole round a vertical axis either with the tube 5 or inside it, so as to sweep over a large area. In all cases the operator looks down the axis of the tube 5 either directly or by means of a special eyepiece or a camera obscura. (Not shown in Fig. 1.)

Fig. 3 shows a modification in the means of transmitting movement to the mirror and projector. The two sectors 10 and 11 are arranged on the same side of the pinion 12, which enables the axes 8 and 9 to be brought nearer together. In this case several projectors may with advantage be placed in line with mirrors interposed between them, so as to give a larger field of view and greater illumination. This figure illustrates also the use of the apparatus for directing the recovery of sunken bodies by means of a grab 14 and two ropes 15 and 16, of which the latter serves for opening the grab and the other for raising the load.

Fig. 4 illustrates the application of the invention to the inspection of a ship's hull with the object of avoiding the need of dry-docking and of permitting the examination of damages resulting from any cause either on the sides or bottom. The apparatus may in this case be advantageously provided with a system of lenses 17, giving a real image, which may be projected by means of the camera 18 on a screen, for example. The different movements of translation, rotation, and vertical displacement may be effected by any suitable means.

The employment of an apparatus such as above described may be extended to the inspection of the zone surrounding the hull and, for instance, to watching for torpedoes and mines, as indicated in Fig. 4. In cases where torpedoes and mines may be expected the apparatus may with advantage be hung in front of the ship, so as to allow the ship to avoid or to sweep for them without danger.

Fig. 5 illustrates the employment of the apparatus in a mercantile or naval harbor for the inspection of hulls. When the demand for the use of this apparatus is likely to become so great as to warrant the expenditure of a sufficient sum it will be advisable to provide a special vessel 19, provided with one or more apparatus of the kind described destined for the inspection of the hulls of all vessels entering or leaving the port and also for the examination of the bottom of the basins, locks, and channels.

I claim—

1. In a device of the character described, the combination, with an illuminating-projector, and means for directing the rays of light from the illuminated field to the eye of the operator, of means for simultaneously aiming the projector and altering the position of the directing means relative thereto to direct the light-rays to the point of observation, and means for excluding disturbing influences from the path of the directed rays.

2. In a device of the character described, the combination, with an illuminating-projector, and a reflector, of means for simultaneously aiming the projector and altering the inclination of the reflector to its support to maintain the direction of the light-rays to the point of observation, and means for excluding the water from the path of the directed rays.

3. In a device of the character described, the combination, with an illuminating-projector, and a reflector, of means for simultaneously aiming the projector and altering the inclination of the reflector to its support to maintain the direction of the light-rays to the point of observation, and a tube inclosing the path of the directed rays.

4. In a device of the character described, the combination, with an illuminating-projector, of means for simultaneously moving the projector through a given angle and the reflector through a proportionately less angle to maintain the direction of the light-rays to the point of observation, and a tube inclosing the path of the directed rays.

5. In a device of the character described, the combination, with a tube provided with a window, an illuminating-projector mounted thereon, and a mirror therein for directing the light-rays from the illuminated field to the eye of the operator, of means for simultaneously moving the projector through a desired angle and the mirror through one-half of the same angle to maintain the direction of the light-rays upon the point of observation.

6. In a device of the character described, a tube provided with a window, toothed sectors carried therein and pivotally mounted on parallel axes, an illuminating-projector fixed upon one sector, a reflecting-mirror fixed upon the other sector opposite the window, the projector-sector having a radius one-half that of the mirror-sector, a pinion with its threads in engagement with the teeth of the sectors, and means for rotating the pinion.

7. In a device of the character described, the combination, with an illuminating-projector, and a reflector, of means for simultaneously aiming the projector and altering the inclination of the reflector to maintain the direction of the light-rays to the point of observation, and means for receiving said light-rays and presenting the same to view.

8. In a device of the character described, the combination, with an illuminating-projector, and a reflector, of means for simultaneously aiming the projector and altering the inclination of the reflector to maintain the direction of the light-rays to the point of observation, and a camera for receiving said light-rays and presenting the same to view.

9. In a device of the character described, a tube provided with a window, toothed sectors carried therein and pivotally mounted on parallel axes, an illuminating-projector fixed upon one sector, a reflecting-mirror fixed upon the other sector opposite the window, the projector-sector having a radius one-half that of the mirror-sector, a pinion with its threads in engagement with the teeth of the sectors, means for rotating the pinion, and a lens in the observation end of the tube.

In testimony whereof I have signed this specification in the presence of two subscribing witnesses.

JUSTUS CORNELIS ZUBLI.

Witnesses:
  LOUIS MARCAL,
  AUGUST SIEGFRIED DOCEN.